(12) United States Patent
Lu et al.

(10) Patent No.: US 7,181,393 B2
(45) Date of Patent: Feb. 20, 2007

(54) METHOD OF REAL-TIME SPEAKER CHANGE POINT DETECTION, SPEAKER TRACKING AND SPEAKER MODEL CONSTRUCTION

(75) Inventors: Lie Lu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 10/306,971

(22) Filed: Nov. 29, 2002

(65) Prior Publication Data

US 2004/0107100 A1  Jun. 3, 2004

(51) Int. Cl.
*G10L 15/00* (2006.01)

(52) U.S. Cl. .................... 704/243; 704/270.1
(58) Field of Classification Search ............. 704/270.1, 704/243
See application file for complete search history.

(56) References Cited

U.S. PATENT DOCUMENTS

| 6,697,778 | B1 * | 2/2004 | Kuhn et al. ............ 704/243 |
| 6,748,356 | B1 * | 6/2004 | Beigi et al. ............ 704/245 |
| 2003/0036905 | A1 * | 2/2003 | Toguri et al. .......... 704/250 |
| 2004/0088723 | A1 * | 5/2004 | Ma et al. .............. 725/19 |

OTHER PUBLICATIONS

J.P. Campbell, Jr., "Speaker Recognition: A Tutorial," Proceedings of the IEEE, vol. 85, No. 9, pp. 1437-1462 (1997).
K. Mori and S. Nakagawa, "Speaker Change Detection and Speaker Clustering Using VQ Distortion for Broadcast News Speech Recogniton," Proceedings ICASSP'01, pp. 413-416 (2001).
S. Chen and P.S. Gopalakrishnan, "Speaker Environment, and Channel Change Detection and Clustering via the Bayesian Information Criterion," Proceedings of DARPA Broadcast News Transcription and Understanding Workshop, (1998).

* cited by examiner

*Primary Examiner*—David Hudspeth
*Assistant Examiner*—Jakieda R. Jackson
(74) *Attorney, Agent, or Firm*—Theodore M. Magee; Westman, Champlin & Kelly, P.A.

(57) ABSTRACT

A method is provided for real-time speaker change detection and speaker tracking in a speech signal. The method is a "coarse-to-refine" process, which consists of two stages: pre-segmentation and refinement. In the pre-segmentation process, the covariance of a feature vector of each segment of speech is built initially. A distance is determined based on the covariance of the current segment and a previous segment; and the distance is used to determine if there is a potential speaker change between these two segments. If there is no speaker change, the model of current identified speaker model is updated by incorporating data of the current segment. Otherwise, if there is a speaker change, a refinement process is utilized to confirm the potential speaker change point.

28 Claims, 4 Drawing Sheets

METHOD OF REAL-TIME SPEAKER CHANGE POINT DETECTION, SPEAKER TRACKING AND SPEAKER MODEL CONSTRUCTION

BACKGROUND OF THE INVENTION

The present invention relates to speaker tracking. In particular, the present invention relates to speaker change detection.

Speaker recognition, which involves associating speech with one or more known or unknown speakers, has been researched in recent years. In casual conversation and news broadcasting, it can be difficult to detect when speech from one speaker ends and speech from a different speaker begins. Accurately detecting when there is a speaker change improves the performance of several functions including conference and meeting indexing, audio/video retrieval or browsing, and speaker-specific speech recognition model updates.

One technique for identifying speaker change points is to apply a section of speech to a set of speaker models to determine which speaker model the speech best matches. Although this can be effective in situations where there are well-developed speaker models, the method is not as effective in situations in which identity of the speakers is unknown or the models are not well developed.

In situations in which the identity of the speakers is unknown, there is no training data to obtain an accurate speaker model a priori. Because of this, it is difficult to detect changes in the speakers.

In the prior art, this problem was addressed by attempting to build speaker models from the same speech signal that was being evaluated for speaker change points. However, these systems have relied on iterative algorithms such as the expectation-maximization (EM) algorithm to train the speech models. Because of the iterative nature of these algorithms, the speaker models could not be generated and used in speaker change detection and speaker tracking in real time.

Thus, a method is needed that allows for real-time speaker change detection and speaker tracking without prior knowledge of the identity and the number of the speakers.

SUMMARY OF THE INVENTION

A method is provided for real-time speaker change detection and speaker tracking in an audio signal stream. The method is a "coarse-to-refine" process, which consists of two stages: pre-segmentation and refinement. In the pre-segmentation process, the covariance of a feature vector of each segment of speech is built initially. A distance is determined based on the covariance of the current segment and a previous segment; and the distance is used to determine if there is a potential speaker change between these two segments. If there is no speaker change, the model of current identified speaker model is updated by incorporating data of the current segment. Otherwise, if there is a speaker change, a refinement process is utilized to confirm the potential speaker change point. In one embodiment, a set of probabilities are determined based on a set of distances. These probabilities are fused to determine a probability of a change in speaker that verifies the change predicted by the distance between the current segment and the previous segment. In further embodiments, when a speaker change is verified, the speaker of the current segment is identified using a distance between the current segment and models associated with registered speakers.

DETAILED DESCRIPTION OF ILLUSTRATIVE EMBODIMENTS

Figure 1:
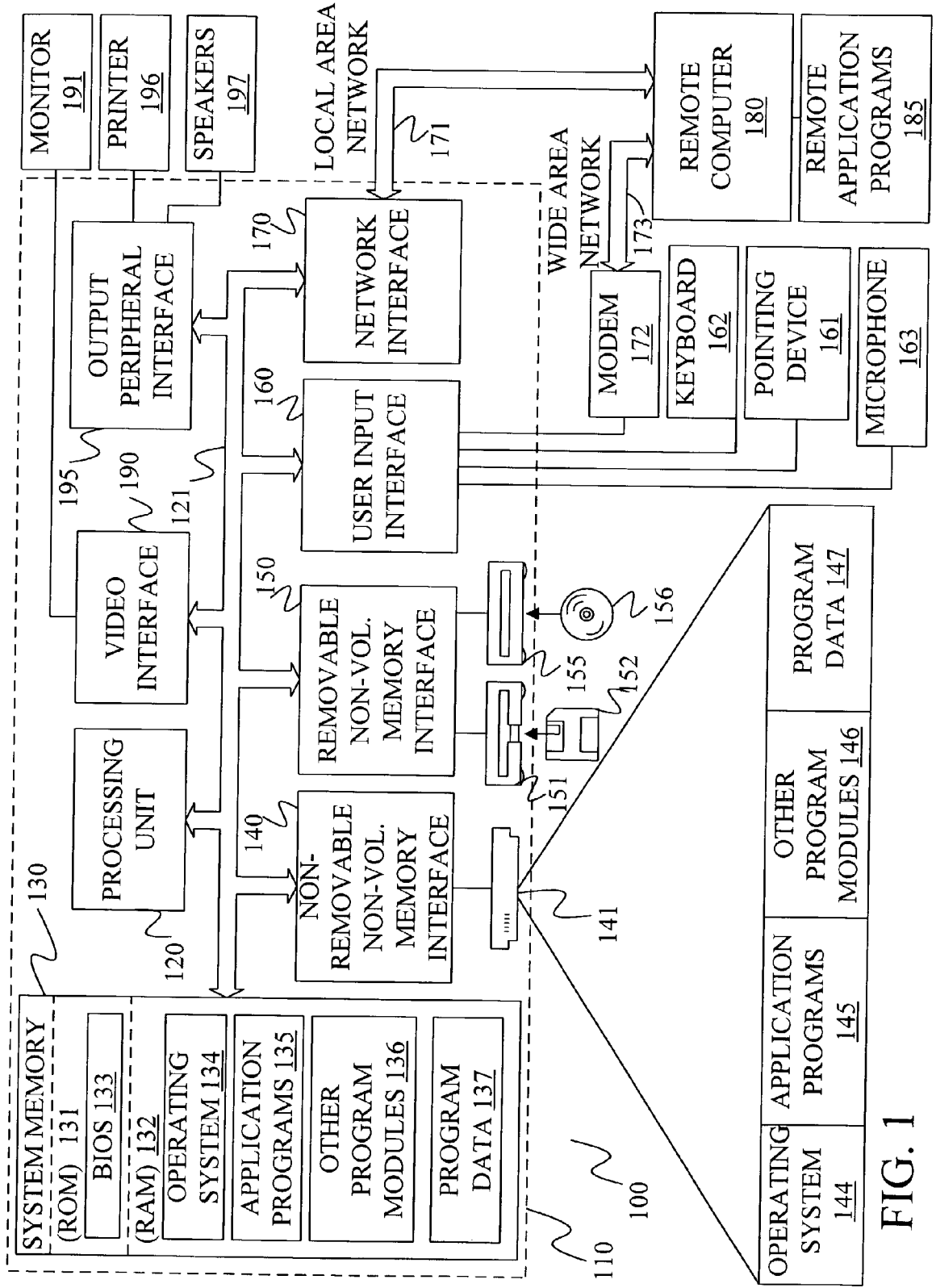
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
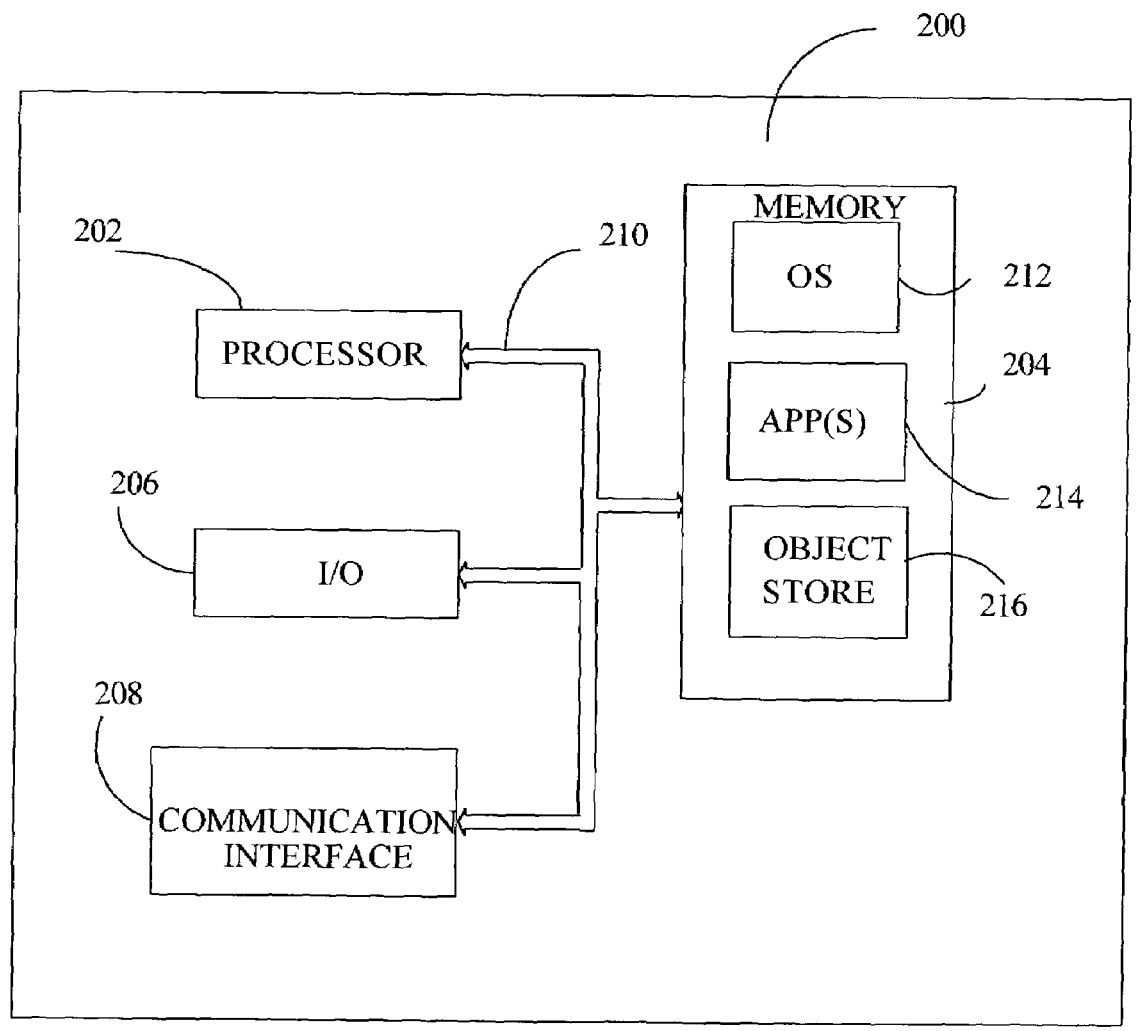
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information. Through communication interface 208, mobile device 200 may be connected to a remote server, personal computer, or network node. Under the present invention, mobile device 200 is capable of transmitting speech data from the mobile device to a remote computer where it can be decoded to identify a sequence of words.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
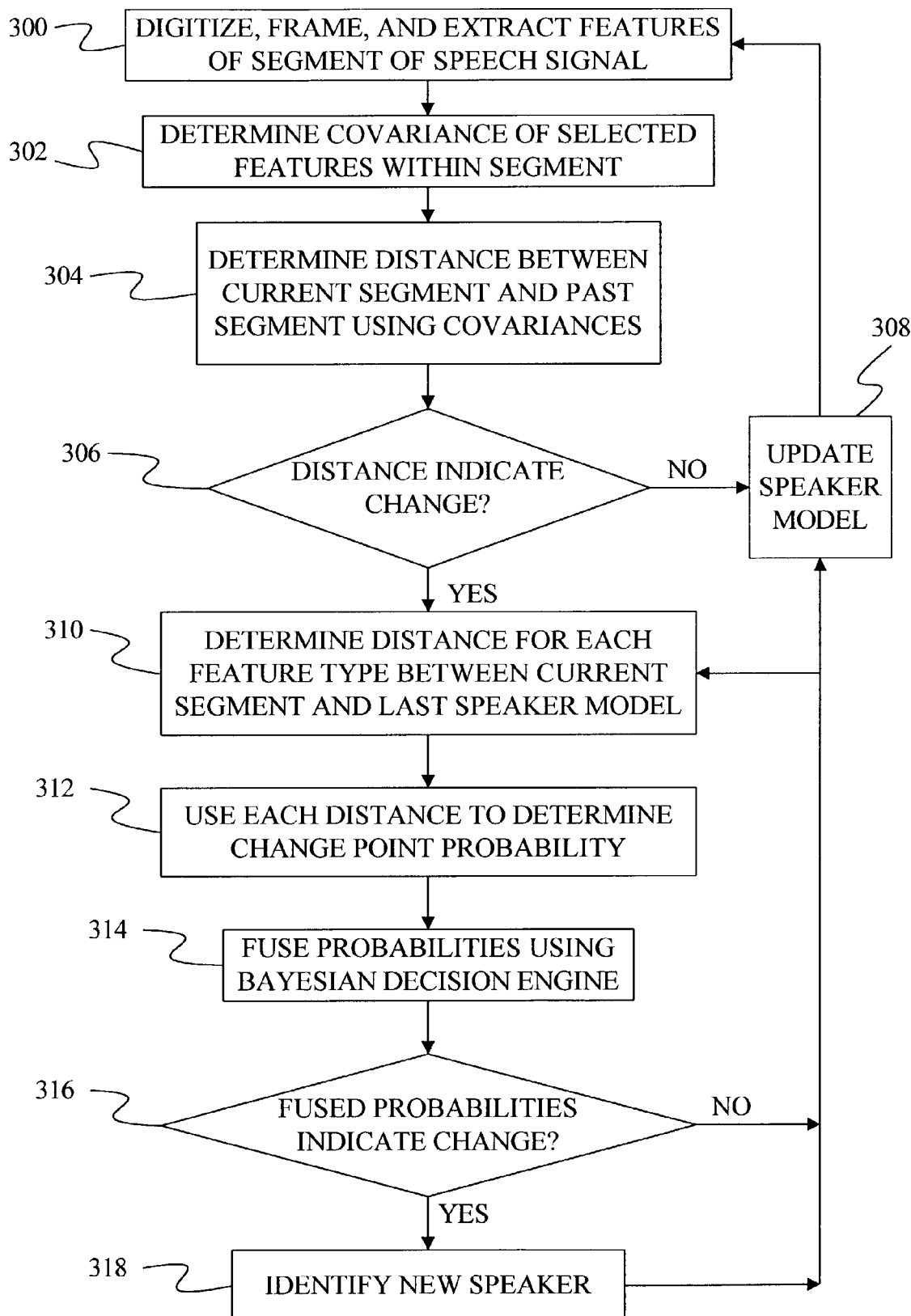
FIG. 3 is a flow diagram of a method of speaker change detection and incremental speaker model update.
Figure 4:
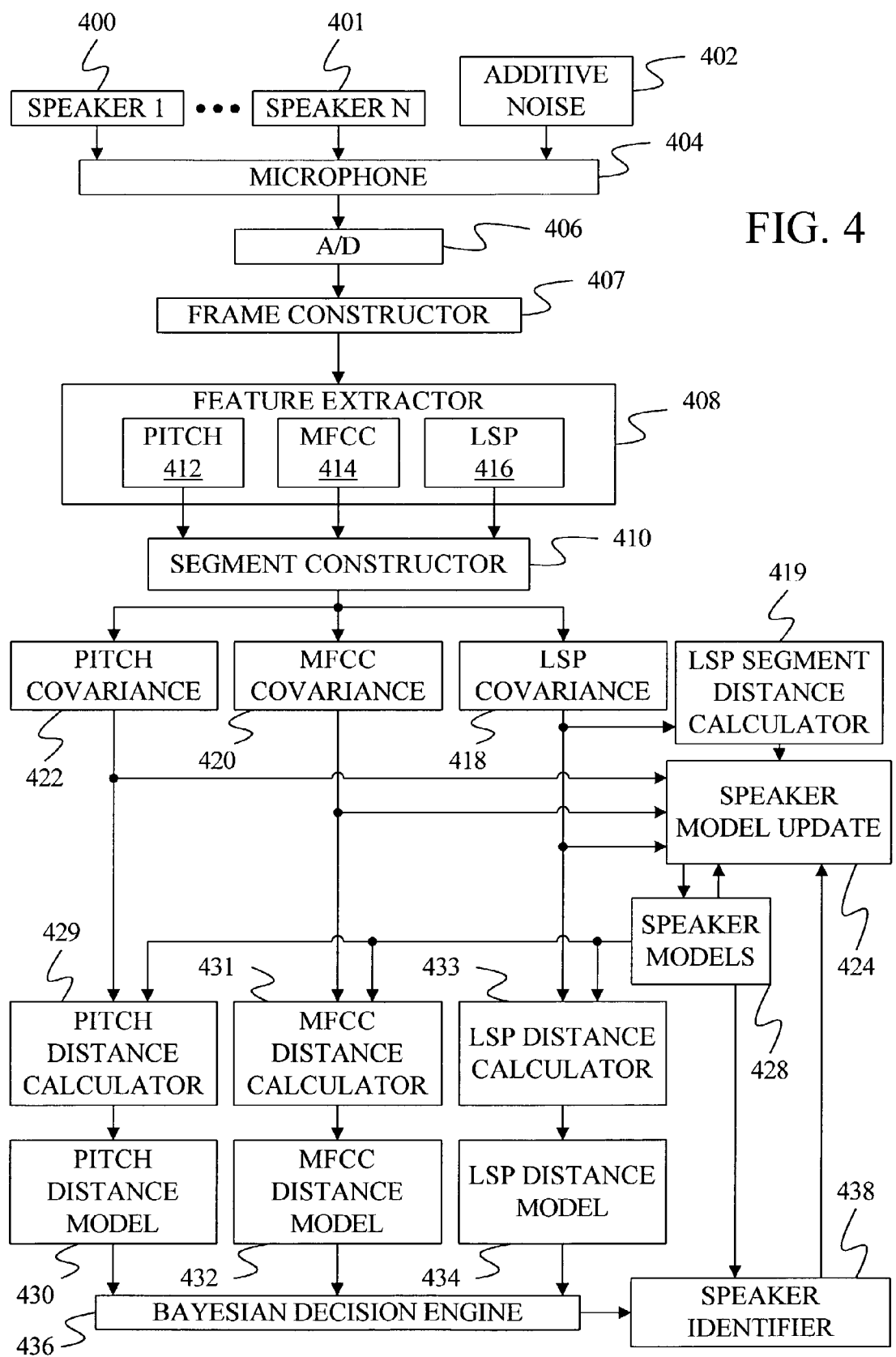
FIG. 4 is a block diagram of a speaker change detection system under one embodiment of the present invention.

FIG. 3 provides a method of speaker change detection and speaker tracking that can be performed on the computing devices of FIGS. 1 and 2 under embodiments of the present invention. FIG. 4 provides a block diagram of components used in the method of FIG. 3. In general, the method of FIG. 3 provides a coarse-to-refine process where a potential speaker change is initially identified using a coarse process and then the potential speaker change is verified using a more refined process.

In step 300 of FIG. 3, an input speech signal which comprises speech from two or more speakers 400 and 401 and additive noise 402 is received by a microphone 404, which converts the audio signals into an electrical analog signal. This analog signal is converted into a set of digital signals by an analog-to-digital converter 406. Under one embodiment, analog-to-digital converter 406 samples the analog signal at a rate of 8 kilohertz and creates a 16 bit value for each sample. The digital values provided by analog-to-digital converter 406 are grouped into frames by a frame constructor 407. Under one embodiment, the frames are non-overlapping and 25 milliseconds long. The frames are provided to a feature extractor 408, which extracts a number of features, including a one-dimensional pitch feature vector 412, an eight-dimensional Mel-Frequency Cepstrum Coefficient (MFCC) feature vector 414, and a ten-dimensional Linear Spectral Pairs (LSP) feature vector 416. Methods for extracting such features are well known in the art. Thus, each frame has 19 features identified for it by feature extractors 408.

The frames constructed by frame constructor 407 and their associated feature vectors are grouped into overlapping segments by segment constructor 410. Under one embodiment, each segment is three seconds long and overlaps its preceding segment by 2.5 seconds. Thus, under an embodiment that uses 25 millisecond long frames, each segment includes 100 frames that are also found in a preceding segment and 20 frames that are not found in the preceding segment.

When sufficient frames for a new segment have been received and their features extracted, the frames for the segment are provided to a LSP covariance calculator 418. At step 302, LSP covariance calculator 418 determines the covariance matrix of the ten LSP features across the frames associated with the current segment. Thus, the covariance matrix is a 10×10 matrix.

At step 304, the covariance matrix obtained for the LSP feature vectors of the current segment is provided to an LSP distance calculator 419, which uses the covariance matrix to determine a distance between the current segment and a previous segment. Under one embodiment, this distance is calculated as:

$$D = \frac{1}{2}tr\left[(C_i - C_j)(C_j^{-1} - C_i^{-1})\right] \qquad \text{EQ. 1}$$

where $C_i$ is the covariance matrix for the current segment, $C_j$ is the covariance matrix for the previous segment and tr[ ] indicates the trace of a matrix, which is the sum of the main diagonal of a square matrix.

At step 306, distance calculator 419 determines whether the distance indicates that there has been a potential speaker change. Under one embodiment, a potential speaker change exists if the distance indicates a local peak distance and if the distance exceeds a threshold. In terms of equations, these tests can be described as:

$$D(i,i+1) > D(i-1,i) \qquad \text{EQ. 2}$$

$$D(i,i+1) > D(i+1,i+2) \qquad \text{EQ. 3}$$

$$D(i,i+1) > Th_i \qquad \text{EQ. 4}$$

where $D(i,j)$ is the distance between the ith segment and the jth segment and $th_i$ is a threshold. Thus, in equation 2, a determination is made as to whether the current distance is larger than a preceding calculated distance, and in equation 3 a determination is made as to whether the current distance is larger than the distance measured between the current segment and the next segment. Thus, equations 2 and 3 guarantee that a local peak in the distance exists.

The threshold in equation 4 may be set manually or may be set adaptively based on an average distance over a set of n preceding segments. Thus, the threshold may be set automatically using the following equation:

$$Th_i = \alpha \cdot \frac{1}{N}\sum_{n=0}^{N} D(i-n-1, i-n) \qquad \text{EQ. 5}$$

where D(i,j) indicates the distance between the ith segment and the jth segment, N is the number of segments used to determine the threshold, and $\alpha$ is a coefficient that under one embodiment is set to 1.2.

If distance calculator 419 determines that there is no speaker change because one or more of the conditions of equations 2, 3, and 4 are not satisfied, distance calculator 419 directs a speaker model update unit 424 to update a speaker model 428 for the speaker identified for the previous segment. This is shown as step 308 in FIG. 3. A process for updating the speaker model under one embodiment of the present invention is discussed further below.

If the conditions set out in equations 2, 3 and 4 indicate that there is a potential speaker change at step 306, the process continues with a more refined speaker change detection process which begins at step 310 where the distance between the current segment and a speaker model for the speaker of the previous segments is determined for the LSP feature vectors, the MFCC feature vectors and the pitch feature vector by distance calculators 433, 431, and 429 respectively.

Under one embodiment, the distances calculated by distance calculators 433, 431, and 429 are weighted sums of the distances between the covariance of the current segment and the covariances found in a set of Gaussian distributions for a speaker identified for the previous segments. These Gaussian distributions are generated incrementally from the speech signal as discussed further below. Under one embodiment, the Gaussian distributions are part of a Gaussian mixture model wherein there are up to 32 different Gaussian distributions within the Gaussian mixture model. Thus, a particular speaker would be modeled using a mixture of 32 different Gaussian distributions. Since these distributions are built incrementally, a speaker may have fewer than 32 distributions at any particular time. For each feature vector type (LSP, MFCC, pitch) the distance is calculated as:

$$D = \sum_{i=1}^{S} w_i \cdot D(C_i, C_m) \qquad \text{EQ. 6}$$

where D is the distance between the current segment and the previous speaker model, S is the number of Gaussian distributions found in the Gaussian mixture model for the speaker identified for the previous segments, $w_i$ is a mixture weight, and $D(C_i, C_m)$ is the distance measured using equation 1 between covariance matrix $C_i$ associated with the ith distribution of the Gaussian mixture model for the speaker identified for the previous segments and $C_m$ is the covariance matrix for the current segment. Note that when there are no Gaussian distributions for a new speaker, $C_i$ is replaced with the covariance matrix of the preceding segment.

At step 312, each of the distances produced by the distance calculators are used to determine the probabilities of two hypotheses. The first hypothesis is that the potential change point represents a true change point, and the second hypothesis is that the potential change point does not represent a true change point. These probability determinations are made by a LSP distance model 434, an MFCC distance model 432, and a pitch distance model 430.

Each of the models 434, 432 and 430 are constructed from distance training data that has been collected using known speaker change points. Thus, the LSP distance model provides the mean vector and covariance matrix of the LSP distances when there is no speaker change point and a separate mean vector and covariance matrix for the LSP distances when there is a speaker change point. Note that the speakers used to train the distance model are not necessarily the same as the speakers that are present in the speech signal in which the change points are being detected. Similarly, MFCC distance model 432 and pitch distance model 430 provide mean vectors and covariance matrices for their respective feature vectors that describe the probability distribution for distance vectors during true speaker change points and during points where the speaker does not change.

Thus each distance model generates two probabilities, one to indicate the probability of a true speaker change point and one to indicate that it is not a true speaker change point. The six probabilities are provided to a Bayesian decision engine 436 at step 314 which fuses the probabilities to determine a single likelihood that this point represents a true speaker change point. In particular, the Bayesian decision engine 436 generates two probabilities according to:

$$P(H_o | F) = P(H_0)^{1-N} \prod_{i=1}^{N} P(H_0 | f_i) \qquad \text{EQ. 7}$$

$$P(H_1 | F) = P(H_1)^{1-N} \prod_{i=1}^{N} P(H_1 | f_i) \qquad \text{EQ. 8}$$

where $P(H_0|F)$ is the probability of a true speaker change point, $H_0$, given the combination of feature vectors, F; $P(H_0)$ is the a priori probability of a true speaker change point; $P(H_0|f_i)$ is the probability of a true change point given by the feature vector $f_i$, which represents the probability generated by a distance model; and N is the number of different distance model probabilities. For example, in the embodiment shown in FIG. 4, N would equal 3. Similarly, $P(H_1|F)$ is the probability that the potential speaker change point is not a true change point given the combination of feature vectors, F, $P(H_1)$ is the a priori probability of no speaker change, and $P(H_1|f_i)$ is the probability of no speaker change point given the ith feature vector of N feature vectors.

Bayesian decision engine 436 combines the probabilities $P(H_0|F)$ and $P(H_1|F)$ into a single likelihood by taking their ratio such that:

$$\lambda = \frac{P(H_0 | F)}{P(H_1 | F)} \qquad \text{EQ. 9}$$

where $\lambda$ is a likelihood ratio and wherein if the likelihood ratio exceeds a threshold, $\lambda_0$, the Bayesian decision engine 436 will determine that the probabilities indicate a true change in speaker and if $\lambda < \lambda_0$, the Bayesian decision engine 436 will determine that the probabilities do not indicate a speaker change at step 316.

If the distance models indicate that there is a real speaker change at step 316, the new speaker is identified at step 318 by a speaker identifier 438. Under one embodiment, this identification begins by determining a weighted sum of the distances between the covariance of the current segment and the covariance of the k nearest Gaussian models in the Gaussian mixture models associated with each registered speaker in the system. In terms of an equation:

$$D' = \sum_{i=1}^{kNN} w_i D(C_i, C_m) \quad \text{EQ. 10}$$

where D' is the weighted sum of the distances to the k nearest Gaussian models, $w_i$ is a mixture weight, kNN represents the k nearest models and $D(C_i,C_m)$ is the distance between the covariance of the ith Gaussian model, $C_i$, and the covariance of the current segment, $C_m$, as calculated using equation 1 above. Under one embodiment, the covariances of only the LSP feature vectors are used in this calculation. In other embodiments, the covariances of the MFCC feature vectors and the pitch feature vector are used as well, with each covariance providing a component of the weighted sum. Although a connection between the covariances of the current segment and speaker identifier 438 is not shown in FIG. 4 for simplicity, those skilled in the art will recognize that speaker identifier 438 is capable of receiving the covariances needed to perform the calculation of equation 10.

For each registered speaker, speaker identifier 438 determines a probability of the current segment being from the speaker and a probability of the current segment not being from the speaker. This is done by applying the distance to a generic distance distribution that is formed on a set of training data. This generic distribution indicates the likelihood that a segment is from a speaker given a weighted sum distance and the probability that the segment is not from a given speaker given the weighted sum distance. These two probabilities are used to determine a likelihood for an individual speaker as:

$$\lambda_i = \frac{P(H_{i0}|F_i)}{P(H_{i1}|F_i)} \quad \text{EQ. 11}$$

where $P(H_{i0}|F_i)$ is the probability that the current segment is produced by speaker i, $P(H_{i1}|F_1)$ is the probability that the current segment is not produced by speaker i, and $\lambda_i$ is the likelihood ratio for speaker i.

Under one embodiment, the registered speaker that produces the highest ratio $\lambda_i$ is identified as the speaker of the current segment if the likelihood ratio exceeds some minimum threshold. If the highest likelihood ratio does not exceed the threshold, the segment is identified as being associated with a new speaker.

After a determination has been made that the current segment belongs to a previous speaker at steps 306 and 316, or belongs to a new speaker at step 318, the speaker model associated with the identified speaker is updated at step 308 if the current segment is available for the identified speaker. Under the present invention, the models are updated in an incremental fashion that does not require iteration.

Under one particular embodiment, each speaker is modeled using a Gaussian mixture model-32 in which 32 separate Gaussian distributions are used to model the speaker. With each new segment that is associated with a particular speaker, one of the 32 mixture components is incrementally updated. In particular, the covariance of the selected mixture component is updated by forming a weighted sum of the covariance of the selected mixture component with the covariance of the current segment. Under one embodiment, the weighting is a function of the number of frames associated with the current state of the selected mixture component and the number of frames associated with the current segment. In other words, for the Gaussian distribution associated with the selected mixture component, the covariance of the distribution would be updated as:

$$C' = \frac{N}{N+N_m}C + \frac{N_m}{N+N_m}C_m \quad \text{EQ. 12}$$

where $C_m$ is the covariance of the current segment, C is the covariance of the current state of the Gaussian distribution for the selected mixture component, N is the number of frames associated with the current state of the Gaussian distribution, $N_m$ is the number of frames associated with the current segment and C' is the updated covariance. Note that N is also updated such that $N'=N+N_m$ where N' is the updated value of N for the distribution.

The mixture components of the mixture model are built sequentially, such that segments are applied to a single mixture component until the covariance of the component does not change significantly after an update. When a mixture component reaches this point, it is stored and a new mixture component is started with the next segment that is associated with the speaker. This continues until 32 Gaussian distributions have been formed for the Gaussian mixture model for the speaker. The weight of each Gaussian distribution in the Gaussian mixture model is set by the corresponding number of frames that were used to form the distribution. Thus, the weight of Gaussian mixture component $G_i$ is computed as $w_i=N_i/N$ where N equals the total number of frames across all of the Gaussian distributions and $N_i$ is the total number of frames in the current Gaussian mixture component.

Note that the present invention may be practiced with fewer or more than 32 mixture components. In addition, the present invention may be practiced without using a mixture model but instead using a single distribution to represent each speaker.

After the speaker model has been updated at step 308, the next segment of speech data is selected at step 300 and the process is repeated.

Thus, the method of the present invention provides an efficient way to identify speaker change points and to update speaker models by utilizing the differences of the covariance matrices associated with segments of speech.

Although the present invention has been described with reference to particular embodiments, workers skilled in the art will recognize that changes may be made in form and detail without departing from the spirit and scope of the invention.

What is claimed is:

1. A method of identifying a change in speaker in a speech signal, the method comprising:
   determining the covariance of a feature across a previous segment;
   determining the covariance of the feature across a current segment;
   determining a distance based on the covariance of the previous segment and the covariance of the current segment; and
   using the distance to determine if the current segment represents speech from a different speaker than the previous segment through steps comprising determining that the distance is greater than a second distance between the previous segment and a segment preceding the previous segment and that the distance is greater than a third distance between the current segment and a segment following the current segment.

2. The method of claim 1 wherein using the distance to determine if the current segment represents speech from a different speaker further comprises determining that the distance exceeds a threshold.

3. The method of claim 2 wherein the threshold is based on an average distance determined over a set of segments.

4. The method of claim 1 further comprising refining the determination of a change in speaker by determining a refined distance between the current segment and a speaker model for a speaker identified for the previous segment.

5. The method of claim 4 further comprising applying the refined distance to a distance model and determining a probability of a change in speaker from the distance model.

6. The method of claim 5 further comprising determining a probability of no change in speaker from the distance model.

7. The method of claim 4 wherein determining a refined distance between the current segment and a speaker model comprises:
determining a first refined distance between the current segment and the speaker model based on a first feature vector; and
determining a second refined distance between the current segment and the speaker model based on a second feature vector.

8. The method of claim 7 further comprising:
applying the first refined distance to a distance model to determine a first probability of a change in speaker; and
applying the second refined distance to a distance model to determine a second probability of a change in speaker.

9. The method of claim 8 further comprising combining the first probability of a change in speaker with the second probability of a change in speaker to form a fused probability of a change in speaker.

10. The method of claim 9 wherein combining the first probability and the second probability comprises performing a Bayesian fusion.

11. The method of claim 9 further comprising using the fused probability to determine if there was a change in speaker.

12. The method of claim 1 further comprising using the covariance of the feature across the current segment to update a model for a speaker.

13. The method of claim 12 wherein updating a model for a speaker comprises incrementally training the model for the speaker.

14. The method of claim 13 wherein updating a model for a speaker comprises determining an updated covariance for the model based on the covariance for the current segment.

15. The method of claim 14 wherein determining an updated covariance for the model comprises determining a weighted sum of a current covariance for the model and the covariance for feature vectors across the current segment.

16. The method of claim 1 wherein the change in speaker is identified in real time.

17. A computer-readable medium having computer-executable instructions for performing steps comprising:
determining a covariance for a feature across a segment of speech;
determining a distance between the covariance of the feature across the segment and the covariance of the feature across a preceding segment of speech;
using the distance to identify a potential change in speakers;
determining a refined distance between the covariance of the feature across the segment and the covariance in a speaker model associated with the preceding segment of speech;
applying the refined distance to a model to determine a probability of a change in speakers; and
using the probability to verify that the potential change in speakers is an actual change in speakers.

18. The computer-readable medium of claim 17 further comprising:
determining a covariance of a second feature across the segment of speech;
determining a second refined distance between the covariance of the second feature across the segment and the covariance of the second feature in a speaker model associated with the preceding segment of speech; and
applying the second refined distance to a model to determine a second probability of a change in speakers.

19. The computer-readable medium of claim 18 wherein using the probability to verify that the potential change in speakers is an actual change in speakers further comprises forming a fused probability by combining the probability and the second probability and using the fused probability to verify that the potential change in speakers is an actual change in speakers.

20. The computer-readable medium of claim 19 wherein combining the probability and the second probability comprises performing a Bayesian fusion.

21. The computer-readable medium of claim 18 wherein the feature is a Linear Spectral Pair feature and the second feature is a Mel-Frequency Cepstrum Coefficient feature.

22. The computer-readable medium of claim 18 wherein the feature is a Linear Spectral Pair feature and the second feature is a pitch feature.

23. The computer-readable medium of claim 18 further comprising determining a speaker model distance between the covariance of the feature across the segment and the covariance in a speaker model to determine a probability that a first speaker associated with the speaker model produced the speech segment.

24. The computer-readable medium of claim 23 further comprising:
determining a second speaker model distance between the covariance across the segment and the covariance of a second speaker model; and
using the second distance to determine a probability that a second speaker associated with the speaker model produced the speech segment.

25. The computer-readable medium of claim 24 further comprising identifying a speaker of the segment by selecting between the first speaker and the second speaker based on the probabilities determined for the first speaker and the second speaker.

26. The computer-readable medium of claim 25 further comprising updating a speaker model of the identified speaker using the segment of speech.

27. The computer-readable medium of claim 26 wherein updating a speaker model comprises calculating the weighted sum of a covariance in the speaker model and the covariance across the segment to form an updated covariance for the speaker model.

28. The computer-readable medium of claim 27 further comprising repeatedly updating the speaker model using a plurality of segments until the covariance of the speaker model does not change significantly between updates.

* * * * *